C. H. DE VOLL.
VEHICLE TIRE.
APPLICATION FILED JULY 31, 1911.
1,092,981.
Patented Apr. 14, 1914.
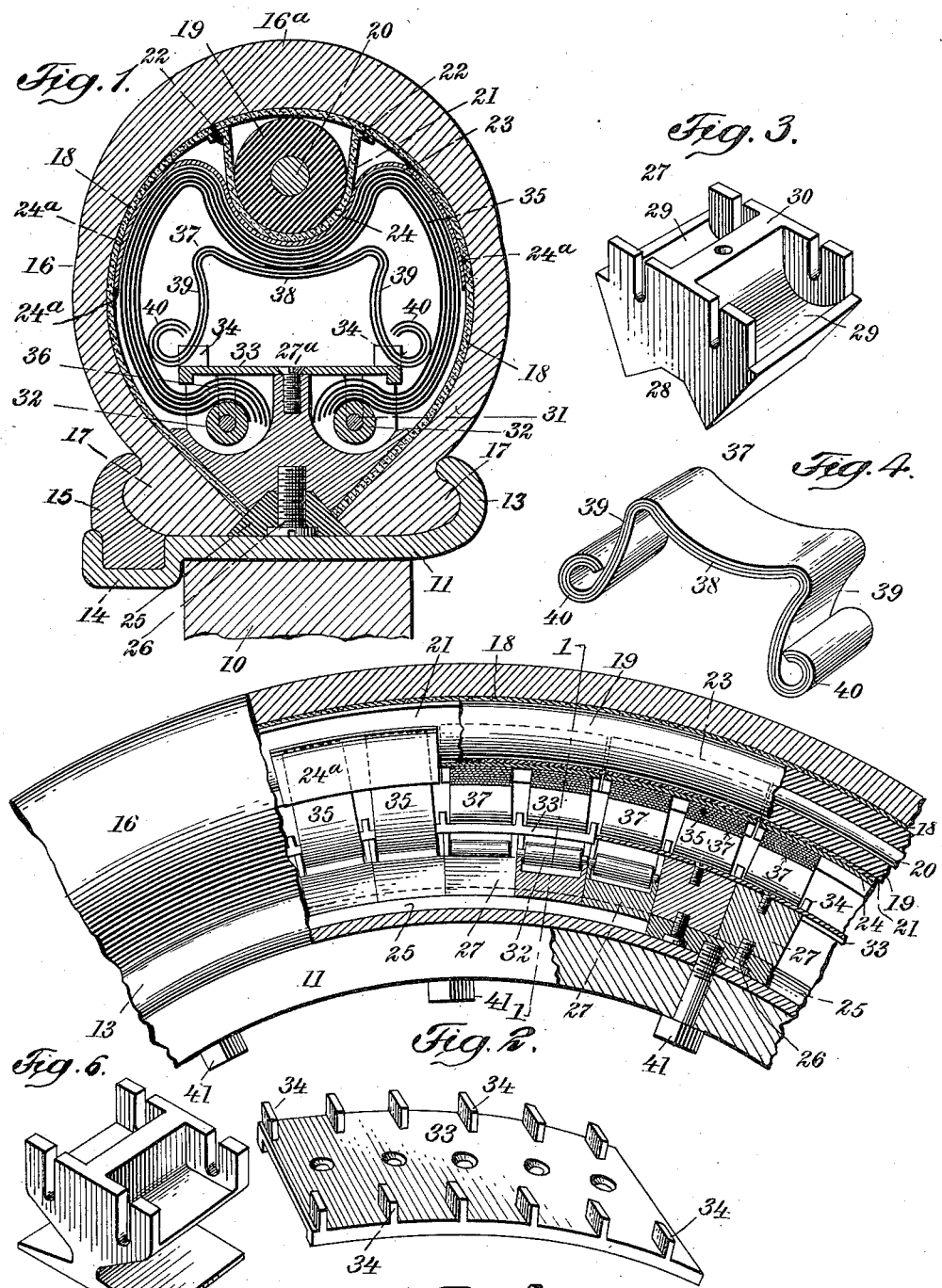

UNITED STATES PATENT OFFICE.

CHARLES H. DE VOLL, OF NEW YORK, N. Y., ASSIGNOR, BY MESNE ASSIGNMENTS, TO THE AMERICAN SPRING TIRE COMPANY, OF DOVER, DELAWARE, A CORPORATION OF DELAWARE.

VEHICLE-TIRE.

1,092,981.   Specification of Letters Patent.   Patented Apr. 14, 1914.

Application filed July 31, 1911. Serial No. 641,412.

*To all whom it may concern:*

Be it known that I, CHARLES H. DE VOLL, a citizen of the United States, residing at the city of New York, borough of Manhattan, in the county and State of New York, have invented certain new and useful Improvements in Vehicle-Tires, of which the following is a full, clear, and exact specification.

My invention relates to improvements in vehicle wheels and the same has for its object more particularly to provide a simple, efficient and reliable tire for wheels designed for use in connection with motor cars or vehicles.

Further, said invention has for its object to provide a tire for vehicle wheels comprising an outer casing, and means for maintaining said casing normally distended by means of a series of resilient members arranged within said casing.

Further, said invention has for its object to provide a tire in which the distending means is composed of a series of resilient members, and a supplemental series of reinforcing members all of which may be readily inserted within the tire and secured in place in order to fill substantially the interior of the casing within which the same are contained.

Further, said invention has for its object to provide a resilient tire wherein each resilient distending and reinforcing member is composed of a plurality of springs arranged one within the other, and means for maintaining the ends of said resilient members together, and in position movably upon a suitable support.

To the attainment of the aforesaid objects and ends, my invention consists in the novel details of construction, and in the combination, connection and arrangements of parts hereinafter more fully described and then pointed out in the claims.

In the accompanying drawings forming part of this specification, wherein like numerals of reference indicate like parts, Figure 1 is a transverse section taken on the line 1—1 of Fig. 2, showing one form of vehicle tire constructed according to, and embodying my said invention. Fig. 2 is a side view, partly broken away and in section; Fig. 3 is a detail perspective view showing one of the supports or saddles for receiving and holding the ends of the series of resilient members or cushioning springs; Fig. 4 is a detail perspective view showing a series of supplemental resilient members; Fig. 5 is a detail perspective view showing the cover plate for said saddles, which also serves to support the ends of said supplemental resilient members, and Fig. 6 is a detail perspective view showing a modified form of saddle, the same being drawn on a reduced scale.

In said drawings 10 designates a portion of a vehicle wheel, upon the outer surface of which is secured an annular plate 11 having an upwardly projecting rim 13 along one of its edges, and a depending rim 14 along the other of its edges adapted to receive a clamping member 15.

16 denotes a casing preferably made of rubber or other suitable material, provided with a heavier tread portion 16$^a$. Along the edges of said casing are provided annular heads or flanges 17, 17 having flat inner edges adapted to rest upon the outer surface of the plate 11, and be secured in position thereon intermediate the clamping member 15, and the rim 13.

Within the casing 16 is disposed an inner casing or lining 18 of leather or other suitable material. Upon the inner side of the lining 18, at the tread portion of the casing 16, is arranged an annular member 19 formed of woven canvas or other suitable material having a central core portion 20 of solid rubber embedded therein. The said annular member 19 is maintained in position within the casing 16 by means of an annular covering 21, preferably made of leather, and secured along its opposite edges by rows of stitching 22, 22, to the inner side of said lining 18.

23 denotes a flexible tread portion or element made of thin brass or other suitable material having a central depressed portion 24 adapted to embrace the annular member 19, and its inclosing casing 18, while the edges 24$^a$, 24$^a$ of said tread extend outward and are conformed to the inner surface of said casing 16.

Upon the outer side of the annular plate 11 is secured an annular member 25 having its opposite edges inclined downward and outward, and upon said annular member 25 are secured, by means of bolts 26, a series of saddles or supports 27 which are arranged side by side, and completely fill the interior of said casing. Each of said saddles 27 has a recess 28 in its base which conforms to the tapering annular member 25 secured to the plate 11, and has its lower portion inclined upward and outward, so as to conform to the inner surface of the casing 16, adjacent to its edges. The upper portion of said saddle is provided with a pair of longitudinal pockets or receptacles 29, 29 which are separated from each other by a central, longitudinal partition 30. The saddle is provided at the opposite ends of the pockets 29, 29 with vertical recesses into which are fitted the trunnions 31, 31 of rollers 32, 32, and 33, 33 denote curved cover plates secured upon the top of the saddles 27, 27 by screws 27$^a$, 27$^a$, and provided at their opposite edges with transverse projections 34, 34. 35, 35 denote a series of nested springs having a central depressed portion adapted to fit over the depressed portion 24 of the flexible tread 23, and ends conformed partly to the edges 24$^a$, 24$^a$ of said tread portion or element 23, and the interior of said casing 16, and the extremities of said springs turned inward and rounded at 36, and disposed upon the rollers 32, 32 mounted within the upper portions of said saddle.

37, 37 denote a series of supplemental reinforcing springs each having a bowed central portion 38, from the opposite ends of which extend downward and outward the side members 39, 39 having their extremities 40, 40 rounded and supported upon the cover plate 33 intermediate the projections 34, 34 thereof.

In order to reduce wear to some extent, alternate members of the springs 35, 37 may be made of brass or other material differing from that of the members contacting therewith, in order to avoid the contact of like metals.

The tire and its supporting parts are secured in position upon the felly of the wheel by means of bolts 41, 41 which extend through said felly and plate 11, and engage the tapering annular support 25.

Having thus described my invention, what I claim and desire to secure by Letters Patent is:

1. A vehicle tire comprising a flexible casing, an annular member arranged upon the inner side of said casing, a series of resilient members arranged within said casing and conformed thereto and to the annular member arranged therein, retaining means arranged at the inner side of said casing adapted to receive and yieldingly retain the ends of said resilient members, securing means extending through said wheel rim and engaging said retaining means whereby to maintain the ends of said resilient members within said retaining means, and resilient reinforcing members having their ends supported upon said retaining means and their intermediate portions engaging said resilient members below the annular member arranged within said casing, substantially as specified.

2. A vehicle tire comprising a flexible outer casing, a relatively thin lining arranged therein, an annular member disposed upon the inner side of said lining below the tread portion of said tire, an annular protecting section secured to said lining and inclosing said annular member, a series of resilient members conformed to the interior of said casing and to said annular member arranged therein, a series of retaining devices, rollers mounted therein adapted to support yieldingly the ends of said resilient members, means for maintaining the ends of said resilient members in position upon said rollers, means for securing said retaining devices in position within said casing and to a wheel rim, and resilient reinforcing members having their ends supported upon said retaining devices, and their intermediate portions bowed and adapted to resist the inward movement of the resilient members first-named, substantially as specified.

3. A vehicle tire comprising a flexible outer casing, a relatively thin lining arranged therein, an annular member disposed upon the inner side of said lining below the tread portion of said tire, an annular protecting section secured to said lining and inclosing said annular member, an annular resilient member arranged within said casing and conformed partly to said casing and partly to said annular member arranged therein, an annular tapering support adapted for securement to a wheel rim, a series of retaining devices mounted upon said annular tapering support, rollers mounted in said retaining devices adapted to support yieldingly the ends of said resilient members, segmental cover plates for said retaining devices, lugs arranged upon said segmental cover plates, resilient reinforcing members having their ends supported upon said segmental cover plates intermediate said lugs, and their intermediate portions bowed and adapted to resist the inward movement of the resilient members first-named, substantially as specified.

4. A vehicle tire comprising a flexible outer casing, a relatively thin lining arranged therein, an annular member disposed upon the inner side of said lining below the tread portion of said tire, an annular protecting section secured to said lining and inclosing said annular member, an annular resilient member arranged within said casing and conformed partly to said casing and partly to said annular member arranged therein, an annular tapering support adapted for securement to a wheel rim, a series of retaining devices mounted upon said annular tapering support, rollers mounted in said retaining devices adapted to support yieldingly the ends of said resilient members, segmental cover plates for said retaining devices, means for securing said cover plates to said retaining devices, lugs arranged along the opposite edges of said segmental cover plates, resilient reinforcing members having their ends supported upon said segmental cover plates intermediate said lugs, and their intermediate portions bowed and adapted to resist the inward movement of the resilient members first-named, substantially as specified.

5. A vehicle tire comprising a flexible outer casing, a relatively thin lining arranged therein, an annular member disposed upon the inner side of said lining below the tread portion of said tire, an annular protecting section secured to said lining and inclosing said annular member, an annular resilient member arranged within said casing and conformed partly to said casing and to said annular member arranged therein, an annular tapering support adapted for securement to a wheel rim, a series of retaining devices mounted upon said annular tapering support, pockets arranged in opposite sides of said retaining devices adapted to support the ends of said resilient members, segmental cover plates for said retaining devices, means for securing said cover plates to said retaining devices, a series of spacing lugs arranged along each longitudinal edge of said cover plates, resilient reinforcing members having their ends supported upon said segmental cover plates intermediate said lugs, and their intermediate portions bowed and adapted to resist the inward movement of the resilient members first-named, substantially as specified.

6. A vehicle tire comprising a flexible outer casing, a relatively thin lining arranged therein, an annular member disposed upon the inner side of said lining below the tread portion of said tire, an annular protecting section secured to said lining and inclosing said annular member, an annular resilient member arranged within said casing and conformed partly to said casing and partly to said annular member arranged therein, an annular tapering support adapted for securement to a wheel rim, a series of retaining devices mounted upon said annular tapering support each comprising a saddle having a tapering recess in its base adapted to be fitted upon said annular tapering support, pockets arranged longitudinally in the upper portion of said saddles, rollers mounted in said pockets and adapted to move vertically therein, and yieldingly support the ends of said resilient members, segmental cover plates secured to said saddles and provided along their upper edges with retaining means, resilient reinforcing members having their ends supported upon said segmental cover plates intermediate said lugs, and their intermediate portions bowed and adapted to resist the inward movement of the resilient members first-named, substantially as specified.

Signed at the city of Chicago, in the county of Cook, State of Illinois, this 30th day of June, nineteen hundred and eleven.

CHARLES H. DE VOLL.

Witnesses:
GEORGE O. GORDON,
A. A. WORSLEY.

Copies of this patent may be obtained for five cents each, by addressing the "Commissioner of Patents, Washington, D. C."